United States Patent [19]

Chang et al.

[11] 3,894,104

[45] July 8, 1975

[54] AROMATIZATION OF HETERO-ATOM SUBSTITUTED HYDROCARBONS

[75] Inventors: Clarence D. Chang, Princeton; William H. Lang, Pennington, both of N.J.; Anthony J. Silvestri, Morrisville, Pa.

[73] Assignee: Mobil Oil Corporation, New York, N.Y.

[22] Filed: Aug. 9, 1973

[21] Appl. No.: 387,219

[52] U.S. Cl............. 260/668 R; 208/135; 208/141; 260/673; 260/673.5; 260/676; 260/682
[51] Int. Cl.............................. C07c 1/20
[58] Field of Search......... 208/135, 141; 260/668 R, 260/449 R, 449 M, 449 L, 449.5, 671 C, 671 M, 671 R, 673, 673.5, 682, 676 R; 252/455.2

[56] References Cited
UNITED STATES PATENTS

| | | | |
|---|---|---|---|
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,483 | 8/1973 | Burress | 260/671 R |

Primary Examiner—C. Davis
Attorney, Agent, or Firm—Charles A. Huggett; Michael G. Gilman

[57] ABSTRACT

Improved aromatization of alcohols, ethers, carbonyl containing compounds and analogues thereof by carrying out the aromatization at about 500° to 850°F in contact with a crystalline aluminosilicate zeolite having a silica to alumina ratio of at least about 12, a constraint index of about 1 to 12, and preferably a crystal density in the hydrogen form of not substantially below about 1.6 grams per cubic centimeter, which zeolite has at least one metal of Groups Ib, IIa, IIb, IIIa, IVa, or VIII incorporated therein.

8 Claims, No Drawings

AROMATIZATION OF HETERO-ATOM SUBSTITUTED HYDROCARBONS

This invention relates to catalytic conversion. It more particularly refers to improvements in the aromatization of simple hetero atom containing organic compounds to hydrocarbon products.

There has recently been discovered a certain novel class of crystalline aluminosilicate zerolites which have been shown to have most unusual properties. These catalysts induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type catalyst useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although catalysts with a silica to alumina ratio of at least 12 are useful, it is preferred to use catalysts having higher ratios of at least about 30. Such catalysts, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Anstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these catalysts ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a catalyst posesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000°F for at least 15 minutes. the catalyst is then flushed with helium and the temperature adjusted between 550°F and 950°F to give an overall conversion between 10 percent and 60 percent. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0.

The class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in West German Offenlagunschrifft No. 2,213,109, the entire contents of which are incorporated herein by reference.

ZSM-21 is more particularly described in U.S. application, Ser. No. 358,192, filed May 7, 1973, and now abandoned, the entire contents of which are incorporated herein by reference.

TEA mordenite is more particularly described in U.S. application Ser. No. 130,442 filed Apr. 11, 1971, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000°F for 1 hour, for example, followed by base exchange with ammonium salts followed by calcination at 1000°F in air. The presence of organic cations in the forming solution may not be absolutely essential to the formation of this type zeolites; however, the presence of these cations does appear to favor the formation of this special type of zeolite. More generally, it is desirable to activate this type catalysts by base exchange with ammonium salts followed by calcination in air at about 1000°F for from about 15 minutes to about 24 hours.

Natural zeolites may sometimes be converted to this type zeolite catalysts by various activation procedures and other treatments such as base exchange, steaming, alumina extraction and calcination, in combinations. Natural minerals which may be so treated include ferrierite, brewsterite, stilbite, dachiardite and epistilbite. The preferred crystalline aluminosilicates are ZSM-5, ZSM-11, ZSM-12, ZSM-21 and TEA mordenite, with ZSM-5 particularly preferred.

The catalysts of this invention may be in the hydrogen form or they may be base exchanged or impregnated to contain ammonium or a metal cation complement. It is desirable to calcine the catalyst after base exchange. In the case of Group IA metals, the cation content should in no case be so large as to effectively inactivate the catalyst. For example, a completely sodium exchanged H-ZSM-5 is not operative in the present invention.

In a preferred aspect of this invention, the catalysts hereof are selected as those having a crystal density, in the dry hydrogen form, of not substantially below about 1.6 grams per cubic centimeter. It has been found that zeolites which satisfy all three of these criteria are most desired because they tend to maximize the production of gasoline boiling range hydrocarbon products. Therefore, the preferred catalysts of this invention are those having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structures. This free space, however, is important as the locus of catalytic activity.

Several cofiled and copending patent applications are directed to the unusual and most unexpected conversion of alcohols, ethers, carbonyl compounds and their analogous sulfur, nitrogen and halogenide (halogen or cyanide) - that is hetero atom containing-organic compounds-to more complicated compounds having a higher carbon to oxygen ratio and at least an equivalent hydrocarbon chain length as the reactant from which they were made. These conversions utilize a crystalline aluminosilicate zeolite molecular sieve having a silica to alumina ratio of at least about 12, a constraint index of about 1 to 12 and, preferably a crystal density in the hydrogen form of not substantially below about 1.6 grams per cubic centimeter and a reaction temperature of about 500° to 850°F if one wishes to maximize aromatic hydrocarbon production.

The use of impregnated and/or exchanged auxiliary metal in combination with zeolite catalysts is generally known, particularly in the field of hydrogen transfer where a good hydrogenation/dehydrogenation component may be required or desired in order to provide good catalysis. In particular, it is known that aromatization reactions and processes as practiced at relatively high temperatures i.e., about 1000°F, with hydrocarbon reactants in contact with a ZSM-5 type zeolite catalyst are markedly improved if the catalyst used is modified to include a zinc component therein. In this regard, data generated to date on hydrocarbon aromatization seem to indicate that the synergistic catalytic effect of zinc added to this catalyst has a temperature dependency, that is the improvement provided by the zinc increases with increasing temperature, maximizing at about 900° to 1000°F. In fact, these same data indicate that the zinc has a detrimental or negative effect upon hydrocarbon aromatization at temperatures below about 775°F. This apparent minimum effective temperature of zinc engendered improvement approximately corresponds to the minimum practical operating temperature for hydrocarbon aromatization. Actually with a large proportion of unsaturation in the hydrocarbon feed, aromatization will proceed at even lower temperatures but this referred to temperature is fairly low for commercial operation. In any case, the available evidence indicates that one would not utilize a zinc modified ZSM-5 zeolite catalyst for low temperature aromatization of hydrocarbons as it is an added expense offering little or no advantage.

It is an object of this invention to provide an improved process of aromatizing hetero atom containing organic compounds.

It is another object of this invention to provide a modified catalyst for such aromatization reaction.

It is a further object of this invention to provide a new and unobvious use of a known catalyst material.

Other and additional objects of this invention will become apparent from a consideration of this entire specification including the claims hereof.

In accord with and fulfilling these objects, one aspect of this invention lies in an improvement in the process of aromatizing compounds of the formula:

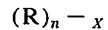

$$(R)_n - x$$

wherein R is a hydrocarbon group of about 1 to 8 carbon atoms, X is oxygen, hydroxyl sulfur, nitrogen or halogen and $n$ is a whole number from 1 to the valence of X, by contacting such compound, or mixtures thereof with each other or with other materials, with a crystalline aluminosilicate zeolite molecular sieve having a silica to alumina ratio of at least about 12, a constraint index of about 1 to 12 and, preferably a crystal density in the hydrogen form of not substantially below about 1.6 grams per cubic centimeter at about 500° to 750°F under such combination of pressure and space velocity conditions as to convert a substantial portion thereof to aromatic hydrocarbons which catalyst is modified by the incorporation therewith, by having exchanged, impregnated and/or vapor deposited thereinto and/or thereon, up to about 10 weight percent of at least one metal of group Ib, IIa, IIb, IIIa, IVa or VIII of the Periodic Table.

It should be noted that this invention resides in the use of this known catalyst modified with at least one of these metals to catalyze an aromatization reaction in a temperature range below that previously considered to be advantageous and operative for such modified catalysts. Thus the instant invention is a marked departure from the art.

Put another way, in the known and previously reported aromatization of hydrocarbons, the addition of zinc or zinc-copper to a ZSM-5 type zeolite catalyst was increasingly indicated to be desirable as the reaction temperature increases there being a minimum temperature of about 775°F below which the zinc or zinc-copper modification of the ZSM-5 type zeolite was apparently not beneficial. In contrast to and departure from these known facts, if the feed to such a catalytic aromatization process is changed from a hydrocarbon to a hetero atom-containing lower aliphatic organic material as hereinbefore defined, and the aromatization conditions reduced to a desirable range of this type of feedstock, the modification of the crystalline aluminosilicate zeolite defined herein by the addition of a metal of the type specified above surprisingly improves the total $C_5^+$ selectivity of the reaction. In many cases, the addition of such modifying metal also increases the proportion of produced aromatics.

Attention is directed to Applications Ser. Nos. 387,222, 387,223 and 387,224 filed on even date herewith for complete details on specific feeds, temperatures, pressures and throughput rates applicable to this process. Representative feeds include alcohols, particularly methanol, ethers, particularly dimethyl ether, ketones, particularly acetone and analagous and homologous materials such as mercaptans or amines, in admixture with each other and/or in admixture with other materials. Representative pressures include about atmospheric to several hundred pounds. Representative temperatures include about 500° to 750°F. Representative throughputs are such as to produce space velocities of about 0.1 to 50 LHSV. The disclosures of these applications are incorporated herein by reference.

The catalyst according to this invention is, as above noted, a particular type of aluminosilicate zeolite molecular sieve having incorporated therein and/or thereon, by conventional impregnation, exchange, and/or vapor deposition techniques, about 0.5 to 10 weight percent of metal. The modified zeolite catalyst may be in matrix form as per usual zeolite catalyst practice with conventional matrix material such as alumina. In such matrix form, the modified zeolite catalyst of this invention represents about 25 to 75 weight percent thereof.

This invention will be illustrated by the following Examples which are in no way to be considered as limiting on the scope thereof. Parts and percentages are by weight unless expressly stated to be to the contrary.

EXAMPLES 1 - 4 (Prior Art)

A catalyst matrix of 65% HZSM-5 and 35% alumina was prepared and utilized in the aromatization of a light catalytically cracked gasoline (containing 10.9 wt. % aromatics and 89.1 wt. % $C_5^+$ non-aromatics) at 734°F (Example 1) and 1022°F (Example 2) at atmospheric pressure and a space velocity of 1 LHSV. A substantially identical ZSM-5 catalyst was prepared and modified with the addition of about 1 percent zinc by standard technique. It was similarly utilized for the aromatization of the same catalytically cracked gasoline at 734°F (Example 3) and 1022°F (Example 4) at atmospheric pressure and 1 LHSV. The following table shows aromatization data for these four examples.

TABLE 1

| Example No. | 1 | 2 | 3 | 4 |
|---|---|---|---|---|
| Temperature (°F) | 734 | 1022 | 734 | 1022 |
| Aromatics production (grams new aromatics/100 grams of feed) | 31 | 42 | 25 | 56 |

In all of the examples that follow, yields are given as a percentage of the total hydrocarbon product.

EXAMPLES 5 and 6

In these Examples, methanol was aromatized at 750°F atmospheric pressure and about 0.67 LHSV using a ZSM-5 catalyst matrixed with 35 percent alumina (Example 5) and such matrix modified by the impregnation thereinto of 1.1 percent zinc (Example 6). The data from these Examples is set forth in the following Table 2.

TABLE 2

| Example | 5 | 6 |
|---|---|---|
| Methanol Conversion (%) | 100 | 99.74 |
| Liquid Yield (%) | 57.95 | 69.44 |
| Aromatics Yield (%) | 40.27 | 53.59 |

EXAMPLES 7 and 8

Example 6 was repeated utilizing a nickel modified ZSM-5 catalyst having the composition 65% Ni H ZSM-5 (0.76 percent Ni) and 35 percent alumina (Example 8) and Example 5 was repeated using the same catalyst as in Example 8 but without the impregnated nickel (Example 7). The following Table 3 reports data from these Examples. Temperature was 700°F, pressure was atmospheric, space velocity was 0.67 LHSV.

TABLE 3

| Example No. | 7 | 8 |
|---|---|---|
| Methanol Conversion % | 99.97 | 99.96 |
| Liquid Yield % | 55.75 | 64.34 |
| Aromatic Yield % | 41.25 | 51.25 |

EXAMPLE 9

Example 6 was rerun with a different sample of zinc ZSM-5 catalyst but retaining all other process conditions and parameters the same. In this test the $C_5^+$ liquid yield was 73.17 percent and the total aromatics produced was 57.89 percent.

EXAMPLE 10

Example 6 was repeated using a similar ZSM-5 matrix catalyst containing 1.2 percent zinc. Methanol was aromatized at 700°F, 0 psig and 1 LHSV to a hydrocarbon product containing 65.35 percent liquid and 50.02 percent aromatics.

EXAMPLES 11 – 25

In the following Examples, set forth in tabular form, methanol has been aromatized in contact with ZSM-5 zeolite modified with the indicated proportion of the indicated metal or metal mixture. In all cases, the modifying metal (s) has been incorporated by exchange with the hydrogen form of ZSM-5.

TABLE 4

| Example No. | Metal | Wt.% | % Conv. | % $C_5^+$ | % Ar. |
|---|---|---|---|---|---|
| 11 | Zn | 2.3 | 99.96 | 68.83 | 52.25 |
| 12 | Cd | 1.2 | 99.97 | 68.46 | 54.51 |
| 13 | Cd | 2.1 | 99.94 | 69.30 | 55.22 |
| 14 | Cd | 1.7 | 99.84 | 70.77 | 52.25 |
| 15 | Mg | | 99.42 | 72.40 | 35.95 |
| 16 | Ca | | 99.36 | 62.66 | 35.25 |
| 17 | Mg Zn | | 99.96 | 63.24 | 44.83 |
| 18 | Al | | 99.95 | 61.40 | 45.80 |
| 19 | Co | | 99.80 | 58.19 | 38.98 |
| 20 | Pt | | 99.98 | 59.32 | 46.84 |
| 21 | Ru | | 99.98 | 56.76 | 41.90 |
| 22 | Pd | | 99.97 | 57.05 | 44.06 |
| 23 | Pt Sn | | 99.98 | 62.38 | 45.16 |
| 24 | Cu | | 99.61 | 66.38 | 42.94 |
| 25 | Cu Zn | | 99.82 | 62.95 | 42.11 |

What is claimed is:

1. In the process for converting a feed comprising compounds of the type $(R)_n - X$, where R is a lower hydrocarbon moiety having 1 carbon atom, X is a hetero moiety selected from the group consisting of oxygen, hydroxyl, sulfur, nitrogen, halogen and cyanide and $n$ is a number up to the valence of X, to other compounds having a higher ratio of R to X than in the feed by contacting such feed with a crystalline aluminosilicate zeolite catalyst, having a silica to alumina ratio of at least about 12 and a constraint index of about 1 to 12, at an elevated temperature of about 500 to about 750°F at a space velocity of about 0.1 to 50 LHSV; the improvement, whereby to produce a product which is predominantly normally liquid hydrocarbon containing a larger proportion of aromatics, which comprises utilizing as said catalyst said zeolite which has been modified by the incorporation therewith of at least one metal of Groups I$b$, II$a$, II$b$, III$a$, IV$a$ and VIII of the Periodic Table.

2. The improved process claimed in claim 1 wherein the feed comprises methanol or dimethyl ether.

3. The improved process claimed in claim 2 wherein said zeolite is ZSM-5.

4. the improved process claimed in claim 3 wherein said modifying metal is at least one metal selected from the group consisting of magnesium, calcium, copper, zinc, cadmium, aluminum, indium, tin, ruthenium, cobalt, nickel, palladium, and platinum.

5. The improved process claimed in claim 4 wherein said metal is present in an effective amount up to about 10 weight percent based upon the total catalyst composition.

6. The improved process claimed in claim 4 wherein said catalyst is in a matrix.

7. The improved process claimed in claim 4 wherein said modifying metal is zinc.

8. The improved process claimed in claim 2 wherein said zeolite has a crystal density, in the hydrogen form, of not substantially below about 1.6 grams per cubic centimeter.

* * * * *

UNITED STATES PATENT AND TRADEMARK OFFICE
CERTIFICATE OF CORRECTION

PATENT NO. : 3,894,104
DATED : July 8, 1975
INVENTOR(S) : CLARENCE D. CHANG, WILLIAM H. LANG and ANTHONY J. SILVESTRI It is certified that error appears in the above-identified patent and that said Letters Patent are hereby corrected as shown below:

Column 1, line 6         "zerolites" should be --zeolites--

Column 1, line 57        "Anstroms" should be --Angstroms--

Column 4, lines 50/51    Formula should read $$--(R)_n - X--$$

not "$(R)_n - \underset{x}{\phantom{X}}$"

Signed and Sealed this

*twenty-fifth* Day of *November 1975*

[SEAL]

Attest:

RUTH C. MASON
*Attesting Officer*

C. MARSHALL DANN
*Commissioner of Patents and Trademarks*